(12) United States Patent
Kun et al.

(10) Patent No.: US 12,683,419 B2
(45) Date of Patent: Jul. 14, 2026

(54) BATTERY CHARGING APPARATUS AND CONTROL METHOD

(71) Applicant: NuVolta Technologies (Hefei) Co., Ltd., Hefei (CN)

(72) Inventors: Cheong Kun, San Diego, CA (US); Zhengyu Li, Shanghai (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 1150 days.

(21) Appl. No.: 17/653,009

(22) Filed: Mar. 1, 2022

(65) Prior Publication Data

US 2023/0283096 A1 Sep. 7, 2023

(51) Int. Cl.
| | |
|---|---|
| *H02J 7/90* | (2026.01) |
| *H02J 50/10* | (2016.01) |
| *H02M 1/08* | (2006.01) |
| *H02M 3/07* | (2006.01) |
| *H02M 3/158* | (2006.01) |

(52) U.S. Cl.
CPC .............. *H02J 7/933* (2026.01); *H02J 50/10* (2016.02); *H02M 1/08* (2013.01); *H02M 3/07* (2013.01); *H02M 3/158* (2013.01); *H02J 2207/20* (2020.01)

(58) Field of Classification Search
CPC ................................................... H02J 7/00712
USPC ......................................................... 320/140
See application file for complete search history.

(56) References Cited

U.S. PATENT DOCUMENTS

| | | | |
|---|---|---|---|
| 2021/0408818 A1* | 12/2021 | Yang ................... | H02J 7/00714 |
| 2023/0163684 A1* | 5/2023 | Liu ...................... | H02M 1/0054 |
| | | | 363/60 |

* cited by examiner

*Primary Examiner* — Eric D Lee
(74) *Attorney, Agent, or Firm* — AP3 Law Firm PLLC

(57) ABSTRACT

A battery charging apparatus includes a first converter coupled between an input voltage bus and a battery, and a second converter coupled between the input voltage bus and the battery, wherein switches of the first converter and switches of the second converter are integrated in a same semiconductor chip, and wherein the first converter and the second converter are configured to be coupled to a controller, the controller being configured to generate gate drive signals for configuring the first converter and the second converter during a charging process of the battery such that a load current distribution between the first converter and the second converter is controlled based on an input current limit of the battery charging apparatus.

20 Claims, 5 Drawing Sheets

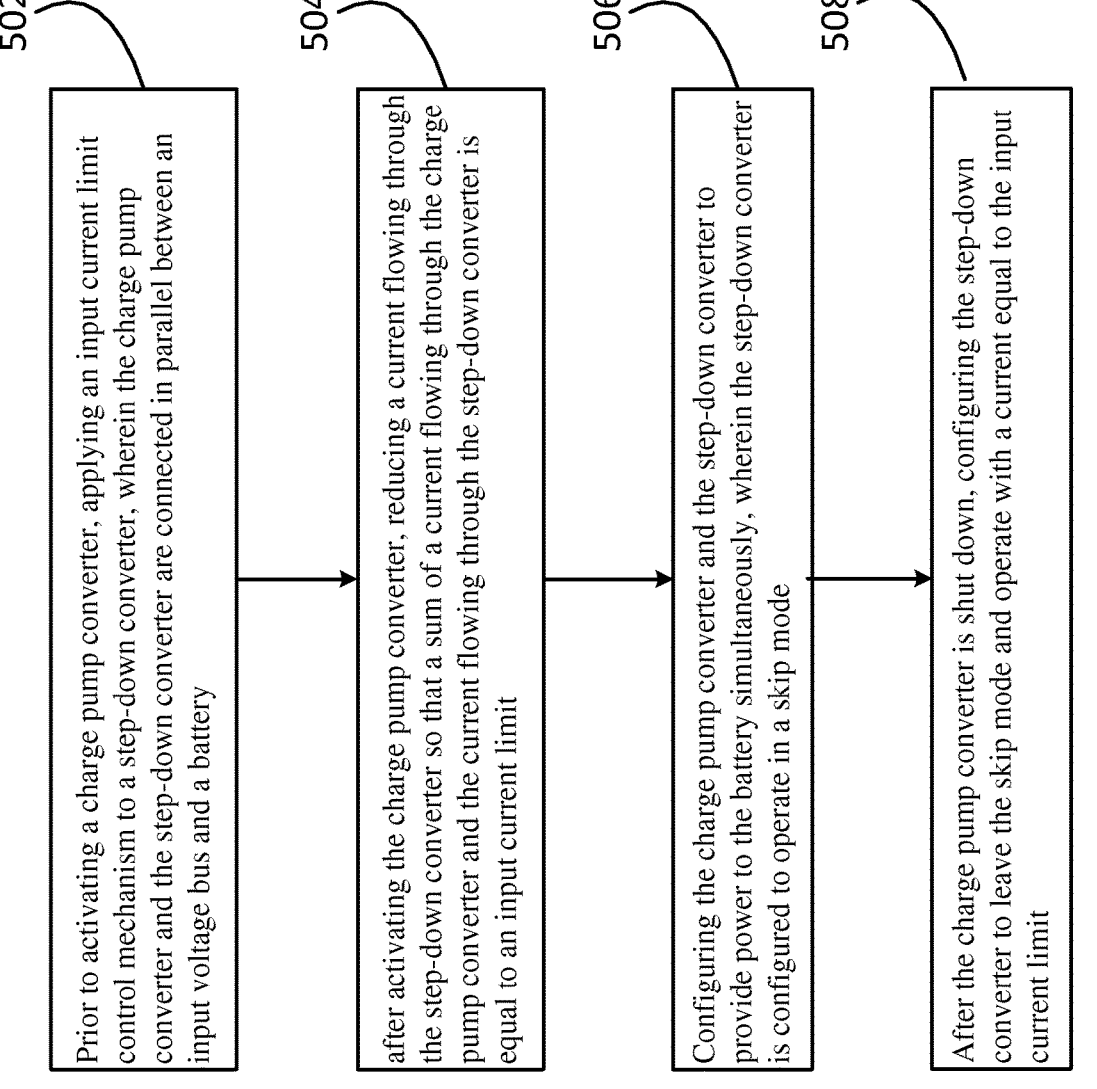

502

Prior to activating a charge pump converter, applying an input current limit control mechanism to a step-down converter, wherein the charge pump converter and the step-down converter are connected in parallel between an input voltage bus and a battery

504 after activating the charge pump converter, reducing a current flowing through the step-down converter so that a sum of a current flowing through the charge pump converter and the current flowing through the step-down converter is equal to an input current limit

506

Configuring the charge pump converter and the step-down converter to provide power to the battery simultaneously, wherein the step-down converter is configured to operate in a skip mode

508

After the charge pump converter is shut down, configuring the step-down converter to leave the skip mode and operate with a current equal to the input current limit

Figure 5

BATTERY CHARGING APPARATUS AND CONTROL METHOD

TECHNICAL FIELD

The present invention relates to a battery charging apparatus and control method, and, in particular embodiments, to a control method for distributing a load current between a charge pump and a switching buck charger.

BACKGROUND

As technologies further advance, a variety of electronic devices, such as mobile phones, tablet PCs, digital cameras, MP3 players and/or the like, have become popular. Each portable device may employ a plurality of rechargeable battery cells. The plurality of rechargeable battery cells may be connected in series or in parallel so as to form a rechargeable battery pack for storing electrical energy.

Battery chargers are employed to restore energy to the batteries. A battery charger is controlled to provide voltage (e.g., a constant voltage charging mode) and current (e.g., a constant current charging mode) to a battery so as to restore energy to the battery.

There may be a variety of power conversion topologies suitable for charging batteries. In accordance with the topology difference, the power conversion topologies can be divided into three categories, namely, switching power converters, linear regulators and switched capacitor power converters. In comparison with other topologies, the switched capacitor converters are less complicated because the switched capacitor converters are formed by a plurality of switches and a flying capacitor. As a result, the switched capacitor converters can provide compact and efficient power for charging batteries.

In order to improve the battery charging performance, a battery charger system may comprise two power stages connected in parallel between an input voltage bus and the battery. A first power stage is a charge pump. A second power stage is a switching charger. The charge pump may be implemented as a suitable switched capacitor charger such as a dual-phase switched capacitor converter. A first phase of the dual-phase switched capacitor converter includes four switches connected in series between the input voltage bus and ground. A first flying capacitor is connected between a common node of two upper switches, and a common node of two lower switches. A common node of the second and third switches is connected to an output voltage bus coupled to the battery. A second phase of the dual-phase switched capacitor converter includes four switches connected in series between the input voltage bus and ground. A second flying capacitor is connected between a common node of two upper switches, and a common node of two lower switches. A common node of the second and third switches is connected to the output voltage bus.

The switching charger may be implemented as a suitable step-down power converter such as a buck converter. The switching charger includes two switches connected in series between the input voltage bus and ground. An inductor is connected between a common node of these two switches, and an output voltage bus. The output voltage bus is coupled to the battery through as an isolation switch providing isolation between the battery and the output voltage bus. The isolation switch includes two diodes. A first diode is between a bulk terminal and a source of the isolation switch. A second diode is between the bulk terminal and a drain of the isolation switch. These two diodes are back-to-back connected. As a result of having the back-to-back connected diodes, the isolation switch is able to fully isolate the battery from the output voltage bus.

In operation, the battery charger system may be part of a mobile phone system. The input of the battery charger system is coupled to a wireless power transfer system. In order to maintain a stable charging process, the charge pump and the switching charger are configured to provide power to the battery simultaneously. Dynamically distributing a load current between the charge pump and the switching charger has an impact on the reliability, cost, and performance of the battery charger system. It would be desirable to have a simple and effective way to dynamically distribute the current between the charge pump and the switching charge without adding extra cost.

SUMMARY

These and other problems are generally solved or circumvented, and technical advantages are generally achieved, by preferred embodiments of the present disclosure which provide a battery charging apparatus and control method.

In accordance with an embodiment, a battery charging apparatus comprises a first converter coupled between an input voltage bus and a battery, and a second converter coupled between the input voltage bus and the battery, wherein switches of the first converter and switches of the second converter are integrated in a same semiconductor chip, and wherein the first converter and the second converter are configured to be coupled to a controller, the controller being configured to generate gate drive signals for configuring the first converter and the second converter during a charging process of the battery such that a load current distribution between the first converter and the second converter is controlled based on an input current limit of the battery charging apparatus.

In accordance with another embodiment, a method comprises prior to activating a charge pump converter, applying an input current limit control mechanism to a step-down converter, wherein the charge pump converter and the step-down converter are connected in parallel between an input voltage bus and a battery, after activating the charge pump converter, reducing a current flowing through the step-down converter so that a sum of a current flowing through the charge pump converter and the current flowing through the step-down converter is equal to an input current limit, configuring the charge pump converter and the step-down converter to provide power to the battery simultaneously, wherein the step-down converter is configured to operate in a skip mode, and after the charge pump converter is shut down, configuring the step-down converter to leave the skip mode and operate with a current equal to the input current limit.

In accordance with yet another embodiment, a controller comprises a plurality of gate drivers configured to generate a plurality of gate drive signals for driving switches of a charge pump converter and switches of a step-down converter, wherein the charge pump converter and the step-down converter are connected in parallel between an input voltage bus and a battery, and a load current distribution between the charge pump converter and the step-down converter is controlled based on an input current limit.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 5 illustrates a flow chart of controlling the battery charging apparatus shown in FIG. 1 in accordance with various embodiments of the present disclosure.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a battery charging apparatus and control method. The disclosure may also be applied, however, to a variety of power systems. Hereinafter, various embodiments will be explained in detail with reference to the accompanying drawings.

Figure 1:
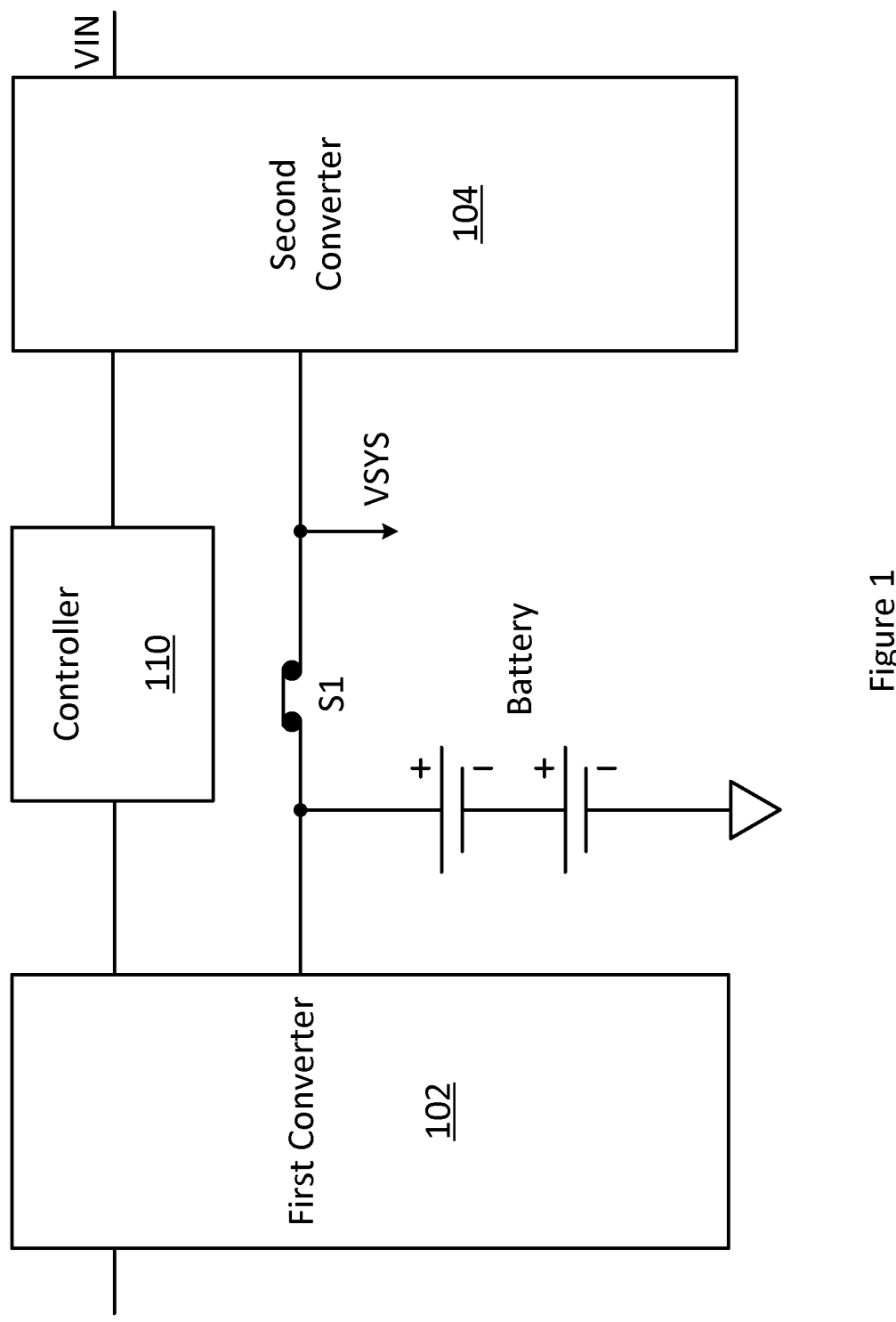
FIG. 1 illustrates a block diagram of a battery charging apparatus in accordance with various embodiments of the present disclosure.

FIG. 1 illustrates a block diagram of a battery charging apparatus in accordance with various embodiments of the present disclosure. The battery charging apparatus comprises a first converter 102, a second converter 104, a switch S1 and a controller 110. The first converter 102 is coupled between an input voltage bus VIN and a battery. The second converter 104 is coupled between the input voltage bus VIN and the battery through the switch S1. A common node of S1 and the second converter 104 is coupled to a system voltage bus VSYS. In some embodiments, VSYS may be used to provide power for other system components directly. In alternative embodiments, VSYS may be used to provide power for other system components through additional power systems such as a voltage regulator.

In some embodiments, switches of the first converter 102 and switches of the second converter 104 are integrated in one single semiconductor chip. A single current sensor is placed at an input of the one single semiconductor chip. The single current sensor is configured to detect a current flowing into the one single semiconductor chip. The detected current is equal to a sum of the current flowing through the first converter 102 and the current flowing through the second converter 104.

In some embodiments, the first converter 102 is a charge pump. More particularly, the charge pump may be a dual-phase switched capacitor converter configured to provide power to charge the battery. Throughout the description, the first converter 102 may be alternatively referred to as a dual-phase charge pump converter or a dual-phase switched capacitor converter.

In some embodiments, the second converter 104 is a step-down converter. More particularly, the step-down converter may be a buck converter configured to provide power to charge the battery. Throughout the description, the second converter 104 may be alternatively referred to as a step-down converter, a buck converter or a switching buck charger. The structures of the dual-phase switched capacitor converter and the buck converter will be described below with respect to FIG. 2.

The switch S1 functions as an isolation switch. As shown in FIG. 1, S1 is connected between the output bus of the second converter 104 and the battery. The switch S1 is able to provide reverse blocking capability to isolate the battery from various system elements coupled to VSYS.

The controller 110 is configured to generate gate drive signals for the switches of the first converter 102 and the second converter 104. Furthermore, the controller 110 is configured to control the operation of each switch based on a plurality of operating parameters. In particular, the controller 110 is configured to generate gate drive signals for configuring the first converter 102 and the second converter 104 during a charging process of the battery such that a load current distribution between the first converter and the second converter is controlled based on an input current limit of the battery charging apparatus. The detailed operation principle of the controller 110 will be described below with respect to FIGS. 3-5.

In some embodiments, the switches of the first converter 102 and the switches of the second converter 104 are integrated in a first semiconductor chip. The controller 110 is in a second semiconductor chip. In alternative embodiments, the switches of the first converter 102, the switches of the second converter 104 and the controller 110 are integrated in a same semiconductor chip.

In some embodiments, the input voltage bus VIN of the first converter 102 and the second converter 104 is coupled to a receiver coil (not shown) of a wireless power transfer system. The first converter 102 and the second converter 104 are configured to provide power for charging the battery. In order to achieve a stable battery charging system, the first converter 102 and the second converter 104 are configured to provide power for charging the battery simultaneously.

One advantageous feature of having the battery charging apparatus shown in FIG. 1 is that the controller 110 is able to use a simple and effective way to dynamically distribute the load current between the first converter 102 and the second converter 104 without adding extra cost.

Figure 2:
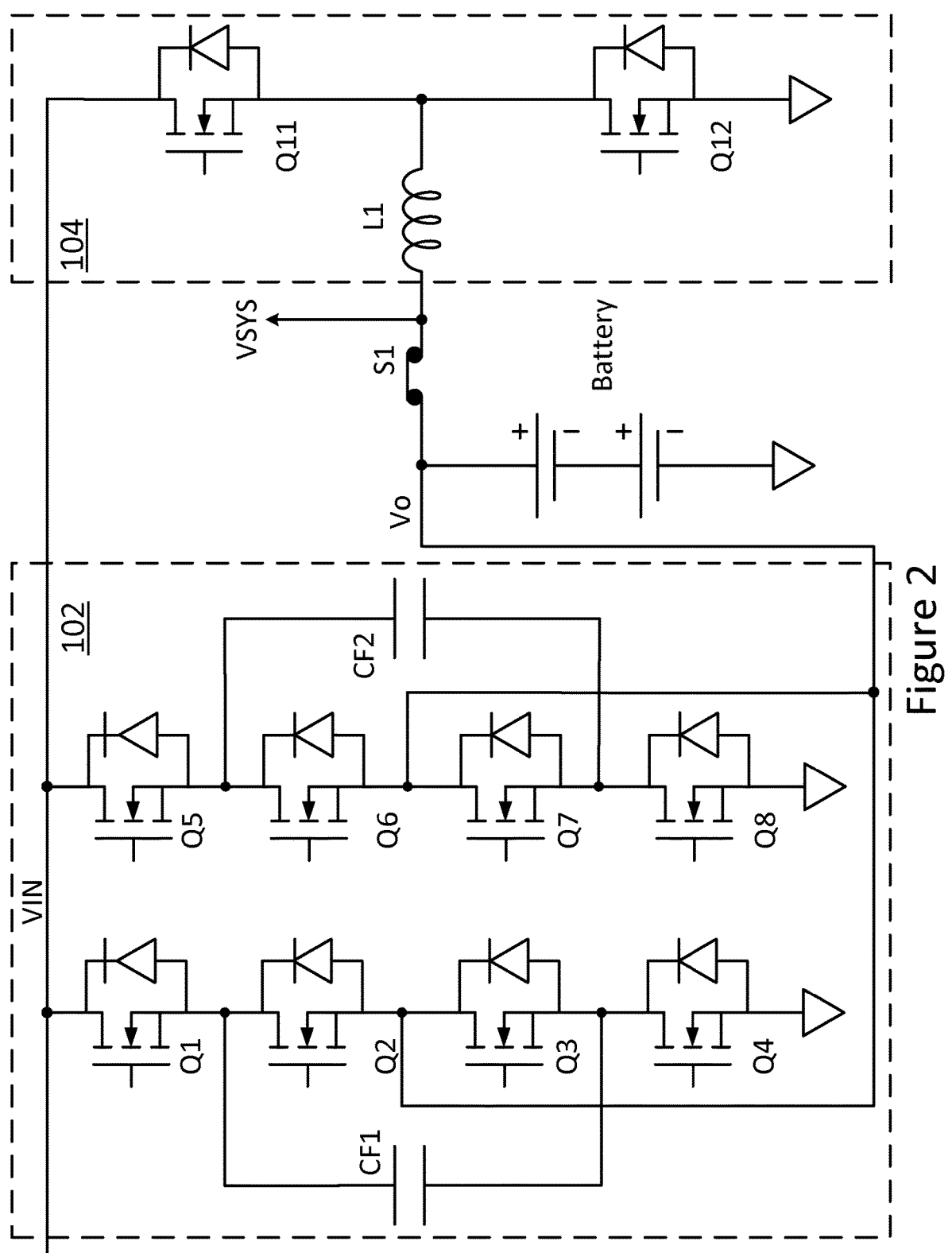
FIG. 2 illustrates a schematic diagram of the battery charging apparatus shown in FIG. 1 in accordance with various embodiments of the present disclosure.

FIG. 2 illustrates a schematic diagram of the battery charging apparatus shown in FIG. 1 in accordance with various embodiments of the present disclosure. The battery charging system includes a dual-phase switched capacitor converter 102 and a buck converter 104. As shown in FIG. 2, the inputs of the dual-phase switched capacitor converter 102 and the buck converter 104 are connected to the input voltage bus VIN. The output of the dual-phase switched capacitor converter 102 is connected to the battery. The output of the buck converter 104 is connected to the battery through the switch S1. In some embodiments, the battery may be implemented as a multi-cell battery. In the present disclosure, the battery is a dual-cell battery as shown in FIG. 2.

The dual-phase switched capacitor converter 102 comprises two legs. A first leg comprises a first switch Q1, a second switch Q2, a third switch Q3 and a fourth switch Q4 connected in series between the input voltage bus VIN and ground. A first flying capacitor CF1 is connected between a common node of Q1 and Q2, and a common node of Q3 and Q4. A second leg comprises a fifth switch Q5, a sixth switch Q6, a seventh switch Q7 and an eighth switch Q8 connected in series between the input voltage bus VIN and ground. A second flying capacitor CF2 is connected between a common node of Q5 and Q6, and a common node of Q7 and Q8. As shown in FIG. 2, a common node of Q2 and Q3 is connected to the output voltage bus Vo. A common node of Q6 and Q7 is also connected to the output voltage bus Vo.

In operation, the dual-phase switched capacitor converter 102 may be configured to operate in either a 2:1 fixed PWM mode or a 1:2 fixed PWM mode. More particularly, when a power source is connected to the input voltage bus VIN, the dual-phase switched capacitor converter 102 converts the voltage on VIN into a lower voltage. In particular, the output voltage (voltage on Vo) is equal to one half of the input voltage (VIN/2). Under this configuration, the dual-phase switched capacitor converter 102 operates in the 2:1 fixed PWM mode. On the other hand, when the battery functions as a power source, the dual-phase switched capacitor converter 102 converts the voltage on Vo into a higher voltage. In particular, the output voltage (voltage on VIN) is twice the input voltage (voltage on Vo). Under this configuration, the dual-phase switched capacitor converter 102 operates in the 1:2 fixed PWM mode. In the present disclosure, when a power source (e.g., a receiver coil of a wireless power transfer system) is connected to VIN, the dual-phase switched capacitor converter 102 is configured to operate in the 2:1 fixed PWM mode to provide power for the battery.

In operation, the operating principle of the first leg is similar to that of the second leg except that the drive signals of the first leg (e.g., Q1) and the drive signals of the second leg (e.g., Q5) are 180 degrees out of phase from each other. For simplicity, only the operating principle of the first leg is described below in detail.

In operation, the first leg of the dual-phase switched capacitor converter 102 is configured to operate in two different phases. During the first phase, switches Q1 and Q3 are turned on, and switches Q2 and Q4 are turned off. Since switches Q1 and Q3 are turned on, a first conductive path is established between VIN and Vo. The first conductive path is formed by switch Q1, the first flying capacitor CF1 and switch Q3. The current flows from VIN to Vo through the first conductive path. During the first phase, the first flying capacitor CF1 is charged and energy is stored in the first flying capacitor CF1 accordingly.

During the second phase, switches Q1 and Q3 are turned off, and switches Q2 and Q4 are turned on. Since switches Q2 and Q4 are turned on, a second conductive path is established. The second conductive path is formed by switch Q4, the first flying capacitor CF1 and switch Q2. During the second phase, the current discharges the first flying capacitor CF1 and the energy stored in the first flying capacitor CF1 decreases accordingly.

The buck converter 104 comprises a high-side switch Q11 and a low-side switch Q12 connected in series between the input voltage bus VIN and ground. The buck converter 104 further comprises an inductor L1 connected between a common node of the high-side switch Q11 and the low-side switch Q12, and an output bus of the buck converter.

A controller (not shown but illustrated in FIG. 1) is configured to generate gate drive signals for switches Q1-Q8 and Q11-Q12. Furthermore, the controller is configured to detect a plurality of operating parameters including the current flowing through the input voltage bus VIN. Based on the detected operating parameters, the controller is able to dynamically distribute the current between the dual-phase switched capacitor converter 102 and the buck converter 104.

It should be noted that the diagram shown in FIG. 2 is merely an example, which should not unduly limit the scope of the claims. One of ordinary skill in the art would recognize many variations, alternatives, and modifications. For example, the first converter may be implemented as a multiple-phase charge pump converter. The second converter may be implemented as any suitable power regulators such as a linear regulator.

In accordance with an embodiment, the switches of FIG. 2 (e.g., switches Q1-Q8, S1 and Q11-Q12) may be metal oxide semiconductor field-effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should be noted while FIG. 2 shows the switches Q1-Q8 and Q11-Q12 are implemented as single n-type transistors, a person skilled in the art would recognize there may be many variations, modifications and alternatives. For example, depending on different applications and design needs, at least some of the switches (e.g., Q11) may be implemented as p-type transistors. S1 may be implemented as two back-to-back connected transistors. Furthermore, each switch shown in FIG. 2 may be implemented as a plurality of switches connected in parallel. Moreover, a capacitor may be connected in parallel with one switch to achieve zero voltage switching (ZVS)/zero current switching (ZCS).

In operation, the dual-phase switched capacitor converter 102 and the buck converter 104 are configured to provide power to the battery simultaneously. In particular, prior to activating the dual-phase switched capacitor converter 102, an input current limit control mechanism is applied to the buck converter 104. After activating the dual-phase switched capacitor converter 102, a current flowing through the buck converter 104 is reduced so that a sum of a current flowing through the dual-phase switched capacitor converter 102 and the current flowing through the buck converter 104 is equal to a predetermined input current limit. The dual-phase switched capacitor converter 102 and the buck converter 104 are configured to provide power to the battery simultaneously. Once the current flowing through the buck converter 104 drops to a low value, the buck converter 104 is configured to operate in a power saving mode. In some embodiments, the power saving mode is a skip mode. The current flowing through the dual-phase switched capacitor converter 102 keep increasing until the load current has been satisfied.

In operation, when the dual-phase switched capacitor converter 102 is shut down, the buck converter 104 is configured to leave the skip mode and operate with a current equal to the predetermined input current limit.

In operation, the input voltage bus is coupled to a receiver coil of a wireless power transfer system. When the dual-phase switched capacitor converter 102 is shut down, the load is reduced to almost zero. A high voltage (e.g., over-voltage) may occur on the input voltage bus. In order to prevent the over-voltage from happening, the buck converter 104 is configured to operate in a forced PWM mode to provide a sink current. This sink current helps to reduce the voltage on the input voltage bus.

Figure 3:
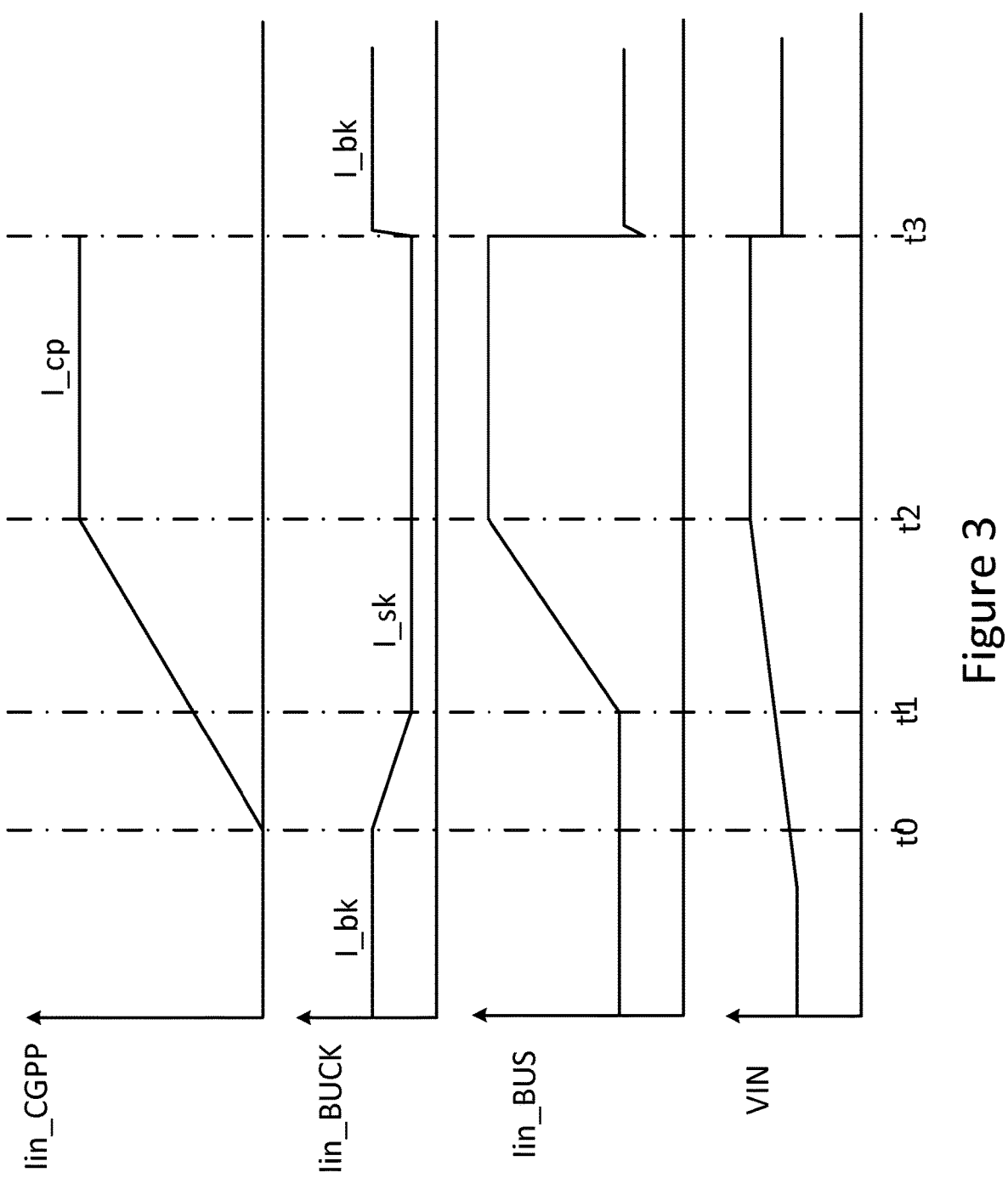
FIG. 3 illustrates various waveforms associated with the battery charging apparatus shown in FIG. 1 in accordance with various embodiments of the present disclosure.

FIG. 3 illustrates various waveforms associated with the battery charging apparatus shown in FIG. 1 in accordance with various embodiments of the present disclosure. The horizontal axis of FIG. 3 represents intervals of time. There may be four rows in FIG. 3. The first row represents the current (Iin_CGPP) flowing through the charge pump converter. The second row represents the current (Iin_BUCK) flowing through the step-down converter. The third row represents the current (Iin_BUS) flowing through the input voltage bus VIN. The fourth row represents the voltage (VIN) on the input voltage bus.

Referring back to FIG. 1, the battery charging apparatus comprises a charge pump converter and a step-down converter. The charge pump converter and the step-down converter are connected in parallel between the input voltage bus VIN and the battery.

Prior to t0, the charge pump converter is not activated. The step-down converter is configured to provide power to the battery. Prior to activating the charge pump converter, an input current limit control mechanism is applied to the step-down converter. As shown in FIG. 3, Iin_BUCK is almost constant under the input current limit control mechanism. Iin_BUCK is equal to I_bk. In some embodiments, I_bk is a predetermined input current limit. Depending on different applications and design needs, I_bk may vary accordingly. Prior to t0, Iin_BUS is equal to Iin_BUCK as shown in FIG. 3.

At t0, the charge pump converter is activated. After the charge pump converter has been activated, Iin_CGPP increases in a linear manner from t0 to t1. In response to the change of Iin_CGPP, Iin_BUCK decreases in a linear manner. As a result, a sum of the current flowing through the charge pump converter and the current flowing through the step-down converter is equal to the predetermined input current limit I_bk as shown in FIG. 3.

From t0 to t1, Iin_BUS is equal to a sum of Iin_BUCK and Iin_CGPP. The voltage on the input voltage bus is proportional to Iin_CGPP. As shown in FIG. 3, VIN increases in a linear manner from t0 to t1.

At t1, Iin_BUCK drops to a low value I_sk. Such a low value triggers the skip mode operation of the step-down converter for further reducing switching losses. After the step-down converter enters in the skip mode, Iin_BUCK cannot be further reduced. Iin_BUCK stays at I_sk as shown in FIG. 3.

From t1 to t2, Iin_CGPP increases in a linear manner to satisfy the load demand. From t1 to t2, Iin_BUS is equal to a sum of Iin_BUCK and Iin_CGPP. As shown in FIG. 3, Iin_BUS increases in a linear manner. The voltage on the input voltage bus is proportional to Iin_CGPP. As shown in FIG. 3, VIN increases in a linear manner from t1 to t2.

From t2 to t3, Iin_CGPP is almost constant. As shown in FIG. 3, Iin_CGPP is equal to I_cp. I_cp is determined by the load of the battery charging apparatus. Iin_BUCK stays at I_sk. Iin_BUS is equal to a sum of Iin_BUCK and Iin_CGPP. As shown in FIG. 3, Iin_BUS is almost constant from t2 to t3. The voltage on the input voltage bus is proportional to Iin_CGPP. As shown in FIG. 3, VIN remains constant from t2 to t3.

From t1 to t3, the charge pump converter and the step-down converter are configured to provide power to the battery simultaneously. The step-down converter is configured to operate in a skip mode.

At t3, an abnormal operating condition (e.g., a system transient) occurs, the charge pump converter is shut down. Iin_CGPP drops from I_cp to zero at t3. In response to this abnormal operating condition, the step-down converter is configured to leave the skip mode and operate with a current equal to the predetermined input current limit I_bk. FIG. 3 shows VIN has a fast transient response during the shutdown mode of the charger pump converter. Such a fast transient response helps to reduce the voltage stress in the battery charging apparatus so as to prevent the battery charging apparatus from being damaged.

One advantageous feature of the control scheme shown in FIG. 3 is that the controller is able to control the step-down converter based on an input current limit control mechanism. This control mechanism can be implemented using a control loop having the current flowing through the input voltage bus as a control variable. By employing this control mechanism, the controller is able to realize the current distribution and switching between the step-down converter and the charge pump converter when the charge pump converter operates in three different operating modes including a startup mode (e.g., from t0 to t2), a normal operating mode (e.g., from t2 to t3) and a shutdown mode (e.g., at t3).

Another advantageous feature of the control scheme shown in FIG. 3 is that during the startup mode, after the charge pump converter is turned on, the input current of the buck charger can be smoothly switched to the current of the charge pump converter. Such a smooth transition helps to avoid the large dynamic of the load. For example, in a complete no-load situation of a wireless power transfer system, the input voltage may fluctuate in a wide range. The swing of the input voltage may affect the normal opening of the charge pump converter. When input fluctuations cause the charge pump converter to shut down, the buck converter is able to quickly provide more power to reduce the over-shoot at the output of the wireless power transfer system. Furthermore, after the charge pump has been turned on, the buck converter is configured to operate in a minimum current to achieve better system efficiency.

Figure 4:
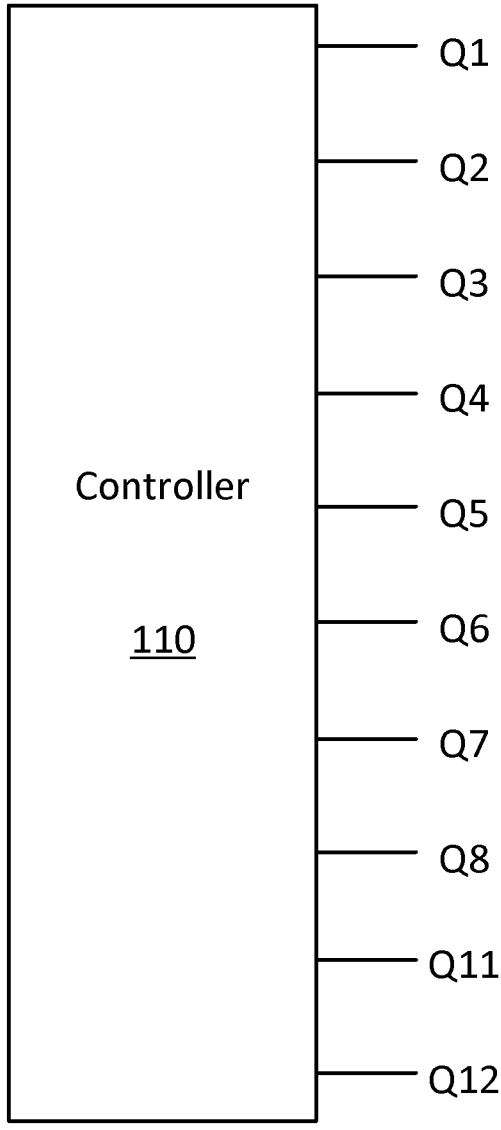
FIG. 4 illustrates a controller for driving the switches of the battery charging apparatus shown in FIG. 1 in accordance with various embodiments of the present disclosure.

FIG. 4 illustrates a controller for driving the switches of the battery charging apparatus shown in FIG. 1 in accordance with various embodiments of the present disclosure. The controller 110 comprises ten gate drivers and a plurality of signal processing devices for processing various operating parameters such as the current flowing through the input voltage bus.

A first gate driver is configured to generate a first gate drive signal applied to the gate of Q1. A second gate driver is configured to generate a second gate drive signal applied to the gate of Q2. A third gate driver is configured to generate a third gate drive signal applied to the gate of Q3. A fourth gate driver is configured to generate a fourth gate drive signal applied to the gate of Q4. A fifth gate driver is configured to generate a fifth gate drive signal applied to the gate of Q5. A sixth gate driver is configured to generate a sixth gate drive signal applied to the gate of Q6. A seventh gate driver is configured to generate a seventh gate drive signal applied to the gate of Q7. An eighth gate driver is configured to generate an eighth gate drive signal applied to the gate of Q8. A ninth gate driver is configured to generate a ninth gate drive signal applied to the gate of Q11. A tenth gate driver is configured to generate a tenth gate drive signal applied to the gate of Q12.

In operation, prior to activating the switches Q1-Q8 of the charge pump converter, the ninth gate driver and the tenth gate driver are configured to generate gate drive signals such that Q11 and Q12 are controlled by an input current limit control mechanism. After the charge pump converter has been activated, the gate drivers are configured such that the charge pump converter and the step-down converter provide power to the battery simultaneously. After the charge pump converter has been turned on, the current flowing through the step-down converter is reduced until the step-down converter enters in a skip mode. Furthermore, when the charge pump converter is shut down, the ninth gate driver and the tenth gate driver are configured such that the step-down converter leaves the skip mode and operates with a current equal to the input current limit.

It should be noted that the controller 110 having ten gate drivers described above is merely an example, which should not unduly limit the scope of the claims. One of ordinary skill in the art would recognize many variations, alternatives, and modifications. For example, external gate drivers may be used to further improve the drive capability FIG. 5 illustrates a flow chart of controlling the battery charging apparatus shown in FIG. 1 in accordance with various embodiments of the present disclosure. This flowchart shown in FIG. 5 is merely an example, which should not unduly limit the scope of the claims. One of ordinary skill in the art would recognize many variations, alternatives, and modifications. For example, various steps illustrated in FIG. 5 may be added, removed, replaced, rearranged and repeated.

Referring back to FIG. 1, the charge pump converter and the step-down converter are connected in parallel between an input voltage bus and a battery. Referring back to FIG. 4, a controller comprises a plurality of gate drivers. The plurality of gate drivers is configured to generate a plurality of gate drive signals for driving the charge pump converter and the step-down converter.

At step 502, prior to activating a charge pump converter, an input current limit control mechanism is applied to the step-down converter. The current flowing through the step-down converter is controlled by a predetermined input current limit.

At step 504, after the charge pump converter has been activated, the current flowing through the step-down converter is reduced so that a sum of a current flowing through the charge pump converter and the current flowing through the step-down converter is equal to the predetermined input current limit.

At step 506, the charge pump converter and the step-down converter are configured to provide power to the battery simultaneously. The current of the step-down is reduced until the step-down converter is configured to operate in a skip mode.

At step 508, after the charge pump converter is shut down, the step-down converter is configured to leave the skip mode and operate with a current equal to the input current limit.

The method further comprises reducing the current flowing through the step-down converter until the step-down converter enters into the skip mode.

The method further comprises detecting a current flowing into the input voltage bus, and applying the input current limit control mechanism to the step-down converter based on a detected current indicative of the current flowing into the input voltage bus.

The method further comprises packaging switches of the charge pump converter and switches of the step-down converter into one single semiconductor chip, and detecting a current flowing into the one single semiconductor chip through a current detecting circuit in the one single semiconductor chip.

The method further comprises after the charge pump converter is shut down, increasing the current flowing through the step-down converter until the current flowing through the step-down converter reaches the input current limit.

The method further comprises coupling the input voltage bus to a receiver coil of a wireless power transfer system.

Referring back to FIG. 2, the charge pump converter comprises a first switch, a second switch, a third switch and a fourth switch connected in series between the input voltage bus and ground, a first flying capacitor connected between a common node of the first switch and the second switch, and a common node of the third switch and the fourth switch, a fifth switch, a sixth switch, a seventh switch and an eighth switch connected in series between the input voltage bus and ground, and a second flying capacitor connected between a common node of the fifth switch and the sixth switch, and a common node of the seventh switch and the eighth switch, and wherein the common node of the second switch and the third switch is connected to a common node of the sixth switch and the seventh switch, and further connected to an output of the charge pump converter.

Referring back to FIG. 2, the step-down converter comprises a high-side switch and a low-side switch connected in series between the input voltage bus and ground, and an inductor connected between a common node of the high-side switch and the low-side switch, and an output bus of the step-down converter.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A battery charging apparatus comprising:
a first converter coupled between an input voltage bus and a battery; and
a second converter coupled between the input voltage bus and the battery, wherein switches of the first converter and switches of the second converter are integrated in a same semiconductor chip, and wherein the first converter and the second converter are configured to be coupled to a controller, the controller being configured to generate gate drive signals for configuring the first converter and the second converter during a charging process of the battery such that a load current distribution between the first converter and the second converter is controlled based on a total input current limit of the battery charging apparatus.

2. The battery charging apparatus of claim 1, wherein:
the first converter is a dual-phase switched capacitor converter; and
the second converter is a buck converter.

3. The battery charging apparatus of claim 2, wherein the dual-phase switched capacitor converter comprises:
a first switch, a second switch, a third switch and a fourth switch connected in series between the input voltage bus and ground;
a first flying capacitor connected between a common node of the first switch and the second switch, and a common node of the third switch and the fourth switch;
a fifth switch, a sixth switch, a seventh switch and an eighth switch connected in series between the input voltage bus and ground; and
a second flying capacitor connected between a common node of the fifth switch and the sixth switch, and a common node of the seventh switch and the eighth switch, and wherein a common node of the second switch and the third switch is connected to a common node of the sixth switch and the seventh switch, and further connected to an output of the dual-phase switched capacitor converter.

4. The battery charging apparatus of claim 2, wherein the buck converter comprises:
a high-side switch and a low-side switch connected in series between the input voltage bus and ground; and
an inductor connected between a common node of the high-side switch and the low-side switch, and an output bus of the buck converter.

5. The battery charging apparatus of claim 4, further comprising:
an isolation switch connected between the output bus of the buck converter and the battery.

6. The battery charging apparatus of claim 1, wherein:
the second converter is configured to operate in a power saving mode in response to an increase of a current flowing through the first converter.

7. The battery charging apparatus of claim 6, wherein:
the second converter is configured to leave the power saving mode once the first converter is shut down.

8. The battery charging apparatus of claim 1, wherein:
the second converter is configured to operate in a forced PWM mode to provide a sink current in response to an increase of a load transient caused by the first converter.

9. A method comprising:
prior to activating a charge pump converter, applying an input current limit control mechanism to a step-down converter, wherein the charge pump converter and the step-down converter are connected in parallel between an input voltage bus and a battery;
after activating the charge pump converter, reducing a current flowing through the step-down converter so that a sum of a current flowing through the charge pump converter and the current flowing through the step-down converter is equal to a total input current limit at the input voltage bus;

configuring the charge pump converter and the step-down converter to provide power to the battery simultaneously, wherein the step-down converter is configured to operate in a pulse skip mode; and
after the charge pump converter is shut down, configuring the step-down converter to leave the pulse skip mode and operate with a current equal to the total input current limit.

10. The method of claim 9, further comprising:
reducing the current flowing through the step-down converter until the step-down converter enters into the pulse skip mode.

11. The method of claim 9, further comprising:
detecting a current flowing into the input voltage bus; and
applying the input current limit control mechanism to the step-down converter based on a detected current indicative of the current flowing into the input voltage bus.

12. The method of claim 9, further comprising:
packaging switches of the charge pump converter and switches of the step-down converter into one single semiconductor chip; and
detecting a current flowing into the one single semiconductor chip through a current detecting circuit in the one single semiconductor chip.

13. The method of claim 9, further comprising:
after the charge pump converter is shut down, increasing the current flowing through the step-down converter until the current flowing through the step-down converter reaches the input total current limit.

14. The method of claim 9, wherein:
coupling the input voltage bus to a receiver coil of a wireless power transfer system.

15. The method of claim 9, wherein the charge pump converter comprises:
a first switch, a second switch, a third switch and a fourth switch connected in series between the input voltage bus and ground;
a first flying capacitor connected between a common node of the first switch and the second switch, and a common node of the third switch and the fourth switch;
a fifth switch, a sixth switch, a seventh switch and an eighth switch connected in series between the input voltage bus and ground; and
a second flying capacitor connected between a common node of the fifth switch and the sixth switch, and a common node of the seventh switch and the eighth switch, and wherein a common node of the second switch and the third switch is connected to a common node of the sixth switch and the seventh switch, and further connected to an output of the charge pump converter.

16. The method of claim 9, wherein the step-down converter comprises:
a high-side switch and a low-side switch connected in series between the input voltage bus and ground; and
an inductor connected between a common node of the high-side switch and the low-side switch, and an output bus of the step-down converter.

17. A controller comprising:
a plurality of gate drivers configured to generate a plurality of gate drive signals for driving switches of a charge pump converter and switches of a step-down converter, wherein:
the charge pump converter and the step-down converter are connected in parallel between an input voltage bus and a battery; and a load current distribution between the charge pump converter and the step-down converter is controlled based on a total input current limit at the input voltage bus.

18. The controller of claim 17, wherein the controller is configured such that:

prior to activating the charge pump converter, apply an input current limit control mechanism to the step-down converter;

after activating the charge pump converter, reduce a current flowing through the step-down converter so that a sum of a current flowing through the charge pump converter and the current flowing through the step-down converter is equal to the total input current limit;

configure the charge pump converter and the step-down converter to provide power to the battery simultaneously, wherein the step-down converter is configured to operate in a pulse skip mode; and after the charge pump converter is shut down, configure the step-down converter to leave the pulse skip mode and operate with a current equal to the total input current limit.

19. The controller of claim 17, wherein:

the charge pump converter comprises:

a first switch, a second switch, a third switch and a fourth switch connected in series between the input voltage bus and ground;

a first flying capacitor connected between a common node of the first switch and the second switch, and a common node of the third switch and the fourth switch;

a fifth switch, a sixth switch, a seventh switch and an eighth switch connected in series between the input voltage bus and ground; and a second flying capacitor connected between a common node of the fifth switch and the sixth switch, and a common node of the seventh switch and the eighth switch, and wherein a common node of the second switch and the third switch is connected to a common node of the sixth switch and the seventh switch, and further connected to an output of the charge pump converter; and the step-down converter comprises:

a high-side switch and a low-side switch connected in series between the input voltage bus and ground; and an inductor connected between a common node of the high-side switch and the low-side switch, and an output bus of the step-down converter.

20. The controller of claim 17, wherein:

switches of the charge pump converter and switches of the step-down converter are packaged in a single semiconductor chip; and the input voltage bus is coupled to a receiver coil of a wireless power transfer system.

* * * * *